(12) United States Patent
Katano et al.

(10) Patent No.: US 6,171,189 B1
(45) Date of Patent: Jan. 9, 2001

(54) VIDEO GAME DEVICE AND STORAGE MEDIUM ON WHICH VIDEO GAME PROGRAM IS STORED

(75) Inventors: Tetsu Katano; Yuji Saito; Yukifumi Makino, all of Tokyo (JP)

(73) Assignee: Sega Enterprises, Ltd, Tokyo (JP)

( * ) Notice: Under 35 U.S.C. 154(b), the term of this patent shall be extended for 0 days.

(21) Appl. No.: 09/029,652

(22) PCT Filed: Jun. 26, 1997

(86) PCT No.: PCT/JP97/02190

§ 371 Date: May 18, 1998

§ 102(e) Date: May 18, 1998

(87) PCT Pub. No.: WO98/00209

PCT Pub. Date: Jan. 8, 1998

(30) Foreign Application Priority Data

Jul. 1, 1996 (JP) .................................................. 8-171017

(51) Int. Cl.[7] ...................................................... A63F 9/22
(52) U.S. Cl. .................................................. 463/43; 463/44
(58) Field of Search ........................... 463/1, 9, 43, 44; 273/308, 148 B, 236; 434/307 R, 307 A, 308, 309, 295, 128, 129, 262

(56) References Cited

U.S. PATENT DOCUMENTS

| | | | |
|---|---|---|---|
| 1,558,229 | * 10/1925 | Bowman | 273/308 X |
| 4,050,698 | * 9/1977 | Brown | 273/308 X |
| 4,858,930 | * 8/1989 | Sato . | |
| 5,267,734 | * 12/1993 | Stamper et al. . | |
| 5,377,997 | * 1/1995 | Wilden et al. . | |
| 5,393,071 | * 2/1995 | Bert | 463/1 X |
| 5,395,112 | * 3/1995 | Darling | 273/148 B |
| 5,498,003 | * 3/1996 | Gechter | 463/1 X |
| 5,553,853 | * 9/1996 | Sackitey | 273/236 |
| 5,604,855 | * 2/1997 | Crawford | 463/9 X |
| 5,618,043 | * 4/1997 | McGraw | 273/308 |
| 5,680,533 | * 10/1997 | Yamato et al. | 463/1 X |
| 5,730,654 | * 3/1998 | Brown | 463/1 |
| 5,890,964 | * 4/1999 | Aoki et al. | 463/44 |

FOREIGN PATENT DOCUMENTS

| | | |
|---|---|---|
| 6-203120 | 7/1994 | (JP) . |
| 06277365 | 10/1994 | (JP) . |
| 08309032 | 11/1996 | (JP) . |

OTHER PUBLICATIONS

SimLife, Maxis Inc. © 1992.*
Creatures, Mindscape Entertainment, Date Unknown.*
Creature Labs Web Pages of Overview and Frequently Asked Questions, 6 pages, world wide web dot creatures2 dot com, 1998.*
Creatures1 Release Year, Operating System and Minimum Specs on http support dot creaturelabs dot com slash support slash C1—support slash index dot html, 2 pages, 1996.*

* cited by examiner

Primary Examiner—Mark A. Sager
(74) Attorney, Agent, or Firm—Dickstein Shapiro Morin & Oshinsky LLP (57) ABSTRACT

A video game machine, which comprises a CPU for executing a program and a memory in which, based on the control provided by the CPU consonant with the execution of the program, are stored data that are read from the program and concern a plurality of characters to be displayed on a display device, provides a pseudo-sense of reality, as though a character projected on a display were a living entity. In such a video game machine, inheritance probabilities are defined for individual portions, of the data concerning a plurality of characters, that constitute the characters, and under a pre-designated condition available during the execution of the program, a portion constituting one character, of portions constituting two characters, is maintained at a predetermined inheritance probability that has been defined, and data for new characters are prepared.

15 Claims, 10 Drawing Sheets

|   | A    | B    | C    | D    |
|---|------|------|------|------|
| a | 0.50 | 0.75 | 0.75 | 0.25 |
| b | 0.25 | 0.50 | 0.75 | 0.75 |
| c | 0.25 | 0.25 | 0.50 | 0.75 |
| d | 0.75 | 0.25 | 0.25 | 0.50 |

Rotate  Displace

| Activities of the player | Emotion value alternation |
|---|---|
| • Player helps pyan pursued by different tribe | Rescued pyan        -1 |
| • Player ignores pyan chased by different tribe | Ignored pyan   Dislike +1 |
| • Same tribe was killed near around | Hate +2 |
| ・・・・・・ | ・・・・・・ |

FIG. 13

VIDEO GAME DEVICE AND STORAGE MEDIUM ON WHICH VIDEO GAME PROGRAM IS STORED

FIELD OF THE INVENTION

The present invention relates to a video game device and a storage medium on which a video game program is stored. In particular, the present invention pertains to a video game device, in consonance with the duration of a game, which enables the repeated performance of a generational transformation process by a character displayed on a display as an artificial living entity, and provides the display of new characters; and to a storage medium on which a video game program is stored.

BACKGROUND OF THE INVENTION

Video game devices that permit CPUs to execute game programs and permit display devices to display a variety of characters have become popular.

And recently, in a background of increased CPU speeds and reduced memory prices, video game devices that can provide virtual reality using three-dimensional data have been developed and are being widely marketed.

In this situation, there is increased demand for games that enable players to experience a sense of unity with characters displayed on displays during the course of the games, or for games that can provide a pseudo-sense of reality, as though a character displayed on a display were a living entity, and for video game devices for these games.

DISCLOSURE OF THE INVENTION

It is, therefore, one object of the present invention to provide a video game device with which a player can experience a sense of unity with a character in a scene on a display, and which can provide a pseudo-sense of reality, as though a character projected on a display were a living entity, and a storage medium on which a video game program is stored.

To achieve the above object, according to a first arrangement for a video game device and a storage medium on which a video game program is stored, a video game device increases:

a controller for executing a program; and a memory in which, based on the control provided by the controller consonant with execution of the program, are stored character data, concerning a plurality of characters to be displayed on a display device, that are read from the program, wherein inheritance probabilities are defined for individual portions, of the character data concerning the plurality of characters, that constitute the characters, and wherein, under a predesignated condition available during the execution of the program, a portion constituting one character, of portions constituting two characters, is maintained at a predetermined inheritance probability that has been defined while data for a new character are prepared.

Also provided, in addition to the first arrangement, is a second arrangement for a video game device and a storage medium on which a video game program is stored, wherein the data concerning the plurality of characters define specific motion patterns for the plurality of characters to be displayed on the display device; and wherein, according to a predesignated condition available during the execution of the program, the specific motion patterns defined respectively for the two characters are defined as specific motion patterns for the new character.

Further, provided, in addition to the first or the second arrangement, is a third arrangement for a video game device and a storage device on which a video game program is stored, wherein the data concerning the plurality of characters are employed to define specific traveling patterns for the plurality of characters to be displayed on the display device; and wherein, according to a predesignated condition available during the execution of the program, the specific traveling patterns defined respectively for the two characters are defined as specific traveling patterns for the new character.

Additionally provided, in addition to the first, the second and the third arrangements, is a fourth arrangement for a video game machine and a storage medium on which a video game program is stored, wherein a player character, the form and the movement of which are varied in response to signals input by a user, is displayed on the display device under the control of the CPU; wherein the data concerning the plurality of characters include consistent relationship data corresponding to a movement of the player character; wherein basic music data constituted by a plurality of measures, and altered music data for each of the measures are stored in the memory; and wherein the altered music data for the measures are combined in accordance with a predetermined usage probability, based on the consistent relationship data, to provide the music data as background musical tones for a display on the display device.

Also, the predesignated condition available during the execution of the program is established when display coordinates for specific portions of the two characters displayed on the display device coincide.

In addition, when the present invention is not limited to the above video game device and is applied to an environmental video picture display apparatus, such an environmental video picture display apparatus includes:

a CPU for executing a program; and a memory in which are stored data that concern a plurality of characters to be displayed on a display device under the control provided by the CPU consonant with the execution of the program, and that are read from the program, wherein the data concerning the plurality of characters define an inheritance probability for portions which constitute the plurality of characters individually, and wherein under a predesignated condition available during the execution of the program a portion of one character, of portions constituting two characters, is maintained at a predetermined inheritance probability that has been defined, and data for a new character are prepared.

With the arrangement for the environmental video picture display apparatus, a plurality of characters to be displayed take the forms of fish in an aquarium.

The other objects of the present invention will become apparent during the course of the description of the preferred embodiment of the present invention given while referring to the accompanying drawings.

DESCRIPTION OF THE EMBODIMENTS OF THE PRESENT INVENTION

One embodiment of the present invention will now be described while referring to the accompanying drawings. The same reference numerals are used throughout to denote corresponding or identical components in the drawings.

Figure 1:
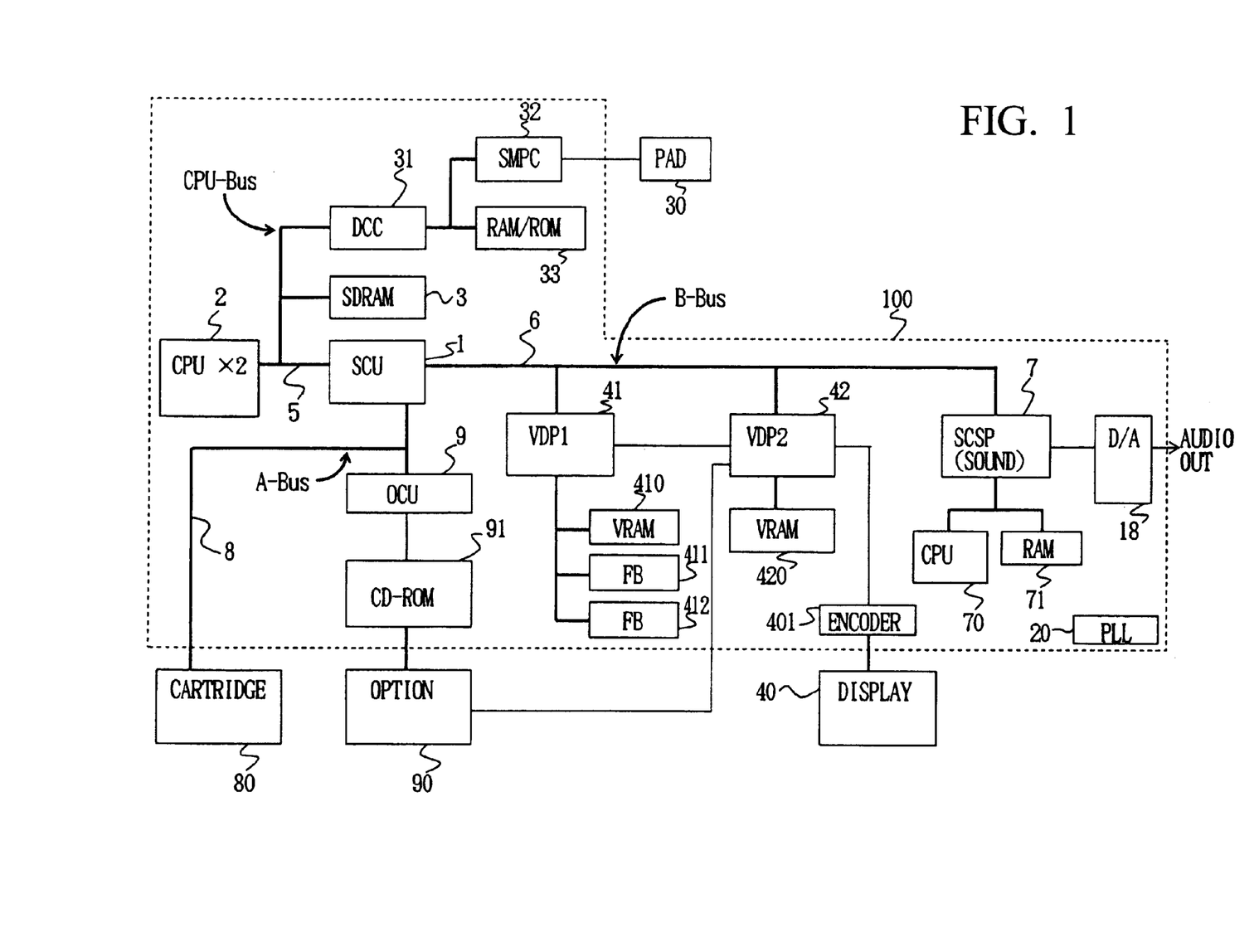
FIG. 1 is a diagram illustrating a video game device according to one embodiment of the present invention.

FIG. 1 is a diagram illustrating a video game device according to one embodiment of the present invention. In FIG. 1, an area 100 enclosed by a broken line is the main body of a video game device.

In FIG. 1, a main CPU 2 has a pair of fast CPUs and controls the entire system. A synchronous DRAM 3 serves as a work RAM used by the main CPU 2.

A system control unit 1 controls the exchange of data along a first bus (C-BUS) 5, a second bus (A-BUS) 8 and a third bus (B-BUS) 6, and serves as a processor for the main CPU 2.

First and second video display processors (VDPs) 41 and 42 are provided, the first VDP 41 employing character data to control the form and the travel of a sprite, i.e., a character to be displayed, or to change the size of the character, e.g., enlarge or reduce it.

A video RAM 410, which is connected to the first VDP 41, is used to store control commands for the first VDP 41 as well as character data.

Frame buffer memories (FBs) 411 and 412, which are also connected to the first VDP 41, have a double buffer arrangement whereby while image data for one screen are being written to one of the FBs, image data for another screen are being read from the other FB.

The second VDP 42 controls the screen scrolling and decides the priority order for the display screens. A video RAM 420, which is connected to the second VDP 42, is used to store a scrolling map, a bit map and coefficient data.

The main CPU 2 and the synchronous DRAM 3 are connected to the system control unit 1 via the first bus (CPU-BUS) 5, and the first and the second VDP 41 and 42 are connected to the control unit 1 via the third bus (B-BUS) 6.

A CPU control circuit 31, which is connected to the first bus (CPU-BUS) 5, controls the first bus (CPU-BUS) 5 when the two CPUs, which comprise the paired fast CPU 2, access the synchronous DRAM 3 and the system control unit 1.

The CPU control circuit 31 assumes control when the CPU 2 accesses an I/O control circuit 32 and a RAM/ROM 33. A detachable control pad 30 is externally connected to the video game device 100, and is manipulated by a user when inputting data.

A detachable cartridge 80, which is connected to the second bus (A-BUS) 8, is externally connected to the video game machine 100, and serves as a memory device for storing a game program. The second bus (A-BUS) 8 has the same size as the third bus (B-BUS) 6.

The second bus (A-BUS) 8 is connected via an optical disk control unit 9 to a CD-ROM drive unit 91 and a functional block, such as an MPEG (Moving Picture Expert Group) block, for the generation of an external picture signal.

A converter 401 converts an analog RGB signal, which is output by the second VDP 42, into a video signal. The video signal from the converter 401 is displayed on a display 40.

A sound processor 7 is connected to the third bus (B-BUS) 6 to control the production of sound by a PCM/FM sound source. A CPU 70 for sound and a work RAM 71 for the CPU 70 are connected to the sound processor 7. The CPU 70 controls the sound processing.

A D/A converter 18 is connected to the sound processor 7, and converts a digital signal into an analog signal to provide audio output. A PLL circuit 20 generates a basic clock to be supplied to the entire system.

The features of the present invention, which are accomplished by the video game device 100 shown in FIG. 1, will now be described.

FIG. 2 is a diagram for explaining the inheritance sequence by which the form of a display character is acquired during the generational transformation process, which is the first feature of the present invention.

Figure 2A:
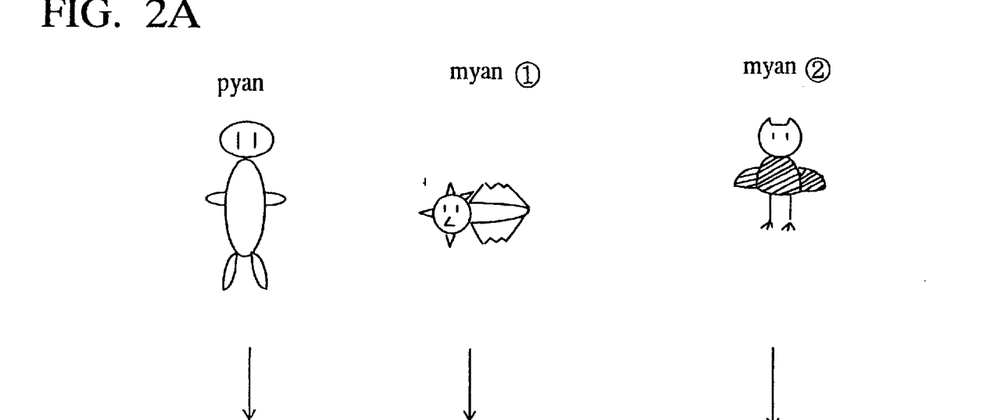
FIGS. 2A to 2D are diagrams for explaining the inheritance of a form of a display character during a generational transformation process, which is a first feature of the present invention.
Figure 2B:
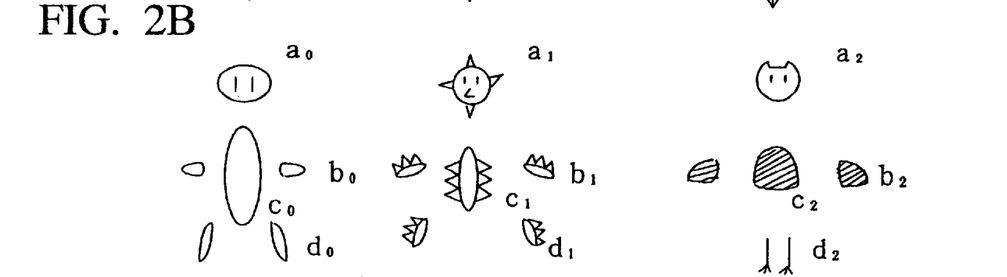

Assume that the characters appearing in a game, played through the execution of a game program which is stored on the game cartridge 80 or, a CD-ROM loaded into the CD-ROM drive unit 91, are defined as a pyan, a myan ① and a myan ②, as shown in FIG. 2A.

In this embodiment, each of these characters is constituted by a head (a), arms (b), a body (c) and legs (d). The portions constituting the pyan are a head ($a_0$), arms ($b_0$), a body ($c_0$), and legs ($d_0$); the portions constituting the myan 1 are a head ($a_1$), arms ($b_1$), a body ($c_1$) and legs ($d_1$), and the portions constituting the myan 2 are a head ($a_2$) arms ($b_2$) a body ($c_2$) and legs ($d_2$).

These data are associated as character data with a game program. Therefore, when the video game device is powered on, under the control of the CPU 2, it reads the game program and the character data from a storage medium on which the game program is stored, e.g., from a CD-ROM loaded into the CD-drive unit 91, and stores the data into the RAM/ROM 33.

As a predesignated condition, when, during the execution of the game in accordance with the game program, the positions at which two characters are displayed coincide (i.e., their xy coordinates on the display screen correspond), a generational transformation process is performed.

Figure 2C:
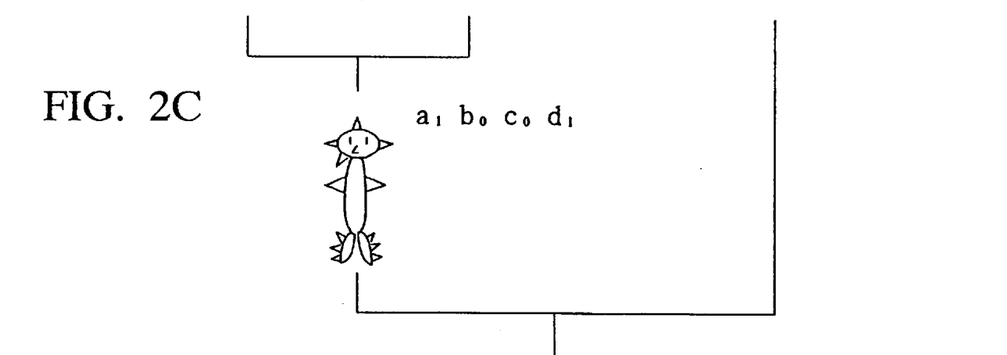

Assuming that the two characters that satisfy the predesignated condition are, for example, the pyan and myan 1, the pyan and myan 1 are synthesized (mated), as is shown in FIG. 2C, and a first new character is produced as the result of the generational transformation process.

The head ($a_1$) and the legs ($a_1$) of the myan 1 are retained as the head and legs of the first new character in FIG. 2C, and the arms ($b_0$) and the body ($c_0$) are retained as the arms and the body of the new character.

Figure 2D:
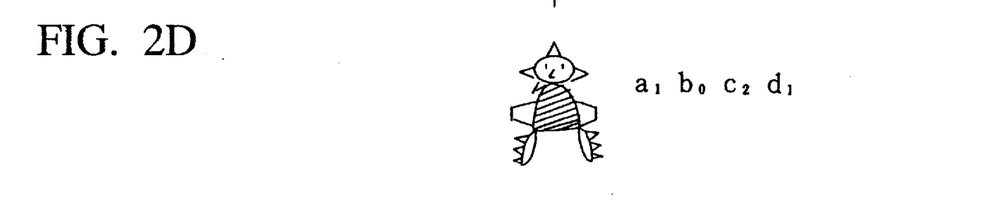

In addition, as is shown in FIG. 2D, when the first new character and the myan 2 satisfy the predesignated condition described above, they are synthesized (mated) to form a second new character. The second new character is constituted by the head ($a_1$) of the myan 1, the arms ($b_0$) of the pyan, the body ($c_2$) of the myan 2 and the legs ($d_1$) of the myan 1.

The data for the new characters are stored in the RAM/ROM 33 in FIG. 1, and are backed up and saved after the game has ended. Therefore, as the playing time for a game is extended, a player can experience the pseudo-sensation of having given birth to a variety of new beings by participation in the generational transformation of the characters.

Figure 3:
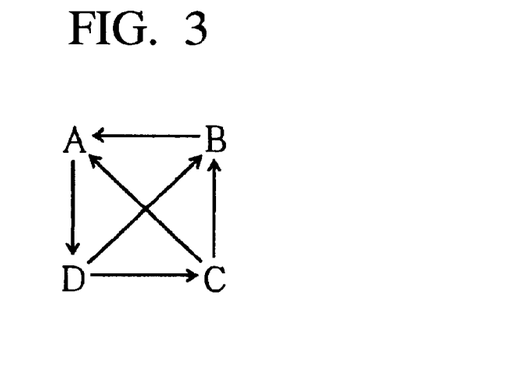
FIG. 3 is a diagram for explaining the method by which a priority order decisions in accordance with the inheritance theory of the present invention are made.
Figure 4A:
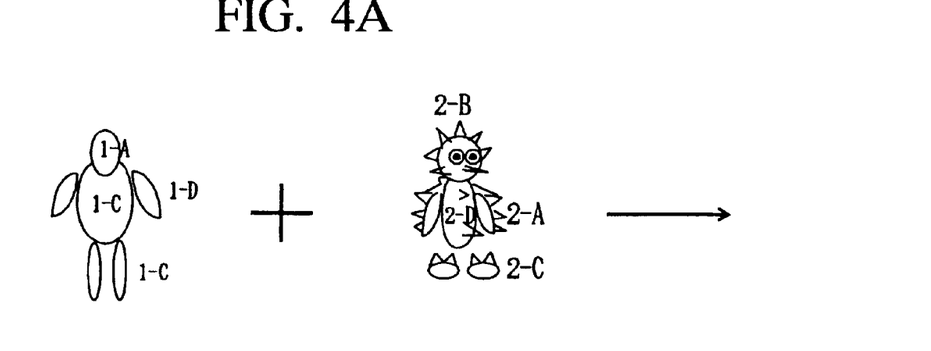
FIGS. 4A and 4B are diagram showing mating examples to explain the method used for acquiring the priority order decision.
Figure 4B:
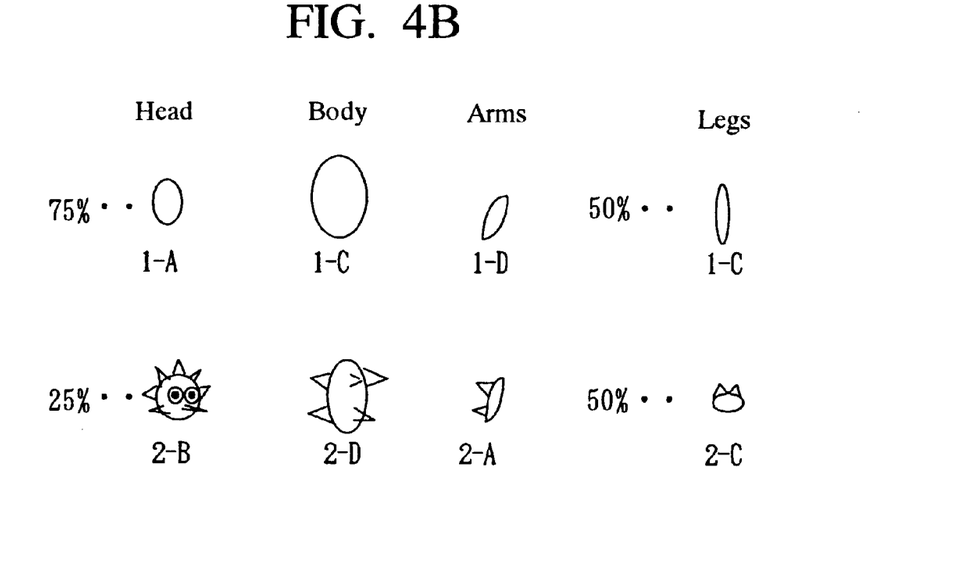
Figure 5:
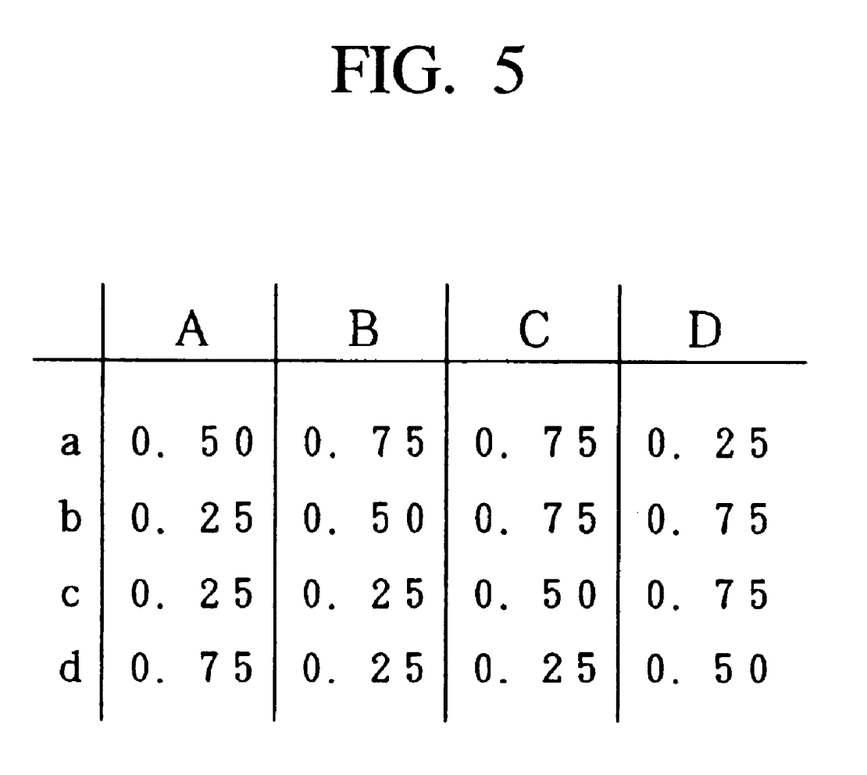
FIG. 5 is a diagram showing the inheritance probability when assuming the priority order between the arrows explained in FIG. 3 is decided at a ratio of 3:1.

FIGS. 3 through 5 are diagrams for explaining the theory (hereinafter referred to as the inheritance theory) whereby portions of an original character are retained for a new character that is formed by the synthesis (the mating) of two characters.

In the present invention, the priorities for the constituent portions of each character are defined as character data A to D. FIG. 3 is a diagram for explaining an example decision process for priorities according to the inheritance theory of the present invention. The direction indicated by an arrow represents the direction of dominance. Since, of A and B, A lies in the direction indicated by the arrow, A is ascendant over B. When the level of dominance for the two portions is the same, either portion can be defined as being the dominant portion through the calculation of random numbers by the CPU 2.

When a conflict arises because multiple portions hold priority A, their priorities are changed to C. The method by which the priority order is decided will now be described by employing the mating process shown in FIGS. 4A and 4B, while assuming that the priority order is decided using a ratio of 3:1. And when a conflict arises between portions holding priority C, their priorities are redesignated as A.

As is shown in FIG. 4A, to mate the first character and the second character, the priorities for the head, the arms, the body and the legs of the first character are defined as A, D, C and C, and the priorities for the head, the arms, the body and the legs of the second character are defined as B, A, D and C.

FIG. 5 is a diagram showing inheritance probabilities (inheritance probabilities (a) through (d) as they correspond with the dominance and recessiveness of the mating partners) assuming that the priorities established by the arrows in FIG. 3 are determined using a ratio of 3:1. When the inheritance probability of (a) to (d) is r, the inheritance probability of A to D is 1-r.

When, for example, (a) to (d) in FIG. 5 correspond to the first character in FIG. 4A, and the priority A awarded to the head of the first character is ascendant over the priority B awarded to the head of the second character. The priority D awarded to the arms of the first character is ascendant over the priority A awarded to the arms of the second character. Further, the priority C awarded to the body of the first character is ascendant over the priority D awarded to the body of the second character.

Similarly, the priority C awarded to the legs of the first character has the same ascendancy as the priority C awarded to the body of the second character.

As a result, as is shown in FIG. 4B, the inheritance probability for the head, the arms and the body of the first character is 75%, and the inheritance probability for the legs is 50%. Therefore, the inheritance probability for the head, the arms and the body of the second character is 25%, and the inheritance probability for the legs is 50%.

The CPU 2 (see FIG. 1) of the video game device determines, by calculation, the portions of a new character that is produced by mating, so that the portions have these inheritance probabilities.

Figure 6A:
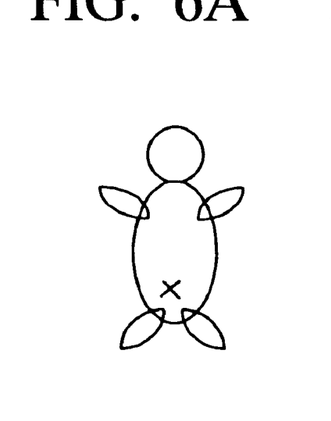
FIGS. 6A to 6D are diagrams for explaining a display method when the portions used for constituting characters are updated during the generational transformation process.
Figure 6B:
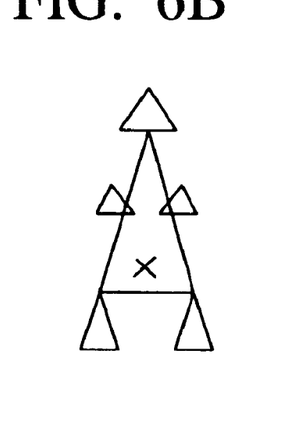
Figure 6C:
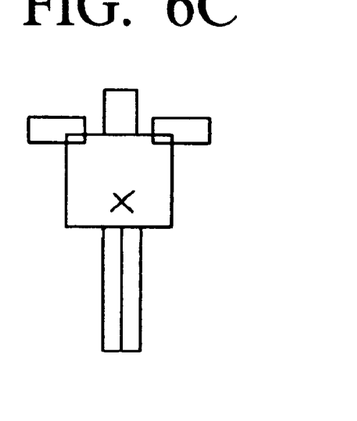
Figure 6D:
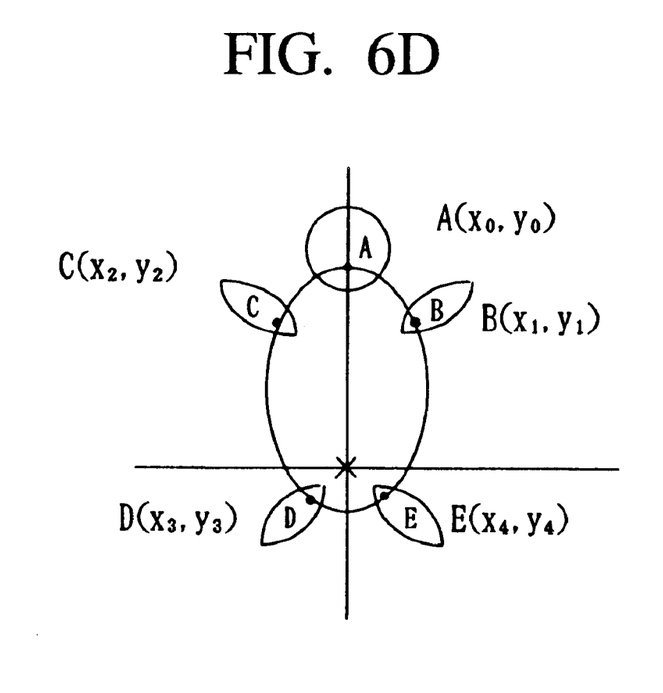

FIGS. 6A and 6D are diagrams for explaining a display character method according to the present invention when the portions constituting the characters are updated during the generational transformation process. As shown in FIGS. 6A to 6C, a reference point x is positioned in the body of each of three characters.

By employing the point x in each body, the points at which the body portion is connected to the other constituent portions of the character can be represented as relative coordinates. As is shown in FIG. 6D, the head A has a connection point with the body at coordinates ($x_0$, $y_0$) relative to the reference point x.

In addition, the left and right arms B and C have connection points with the body at coordinates ($x_1$, $y_1$) and ($x_2$, $y_2$) relative to the reference point x, and the legs D and E have connection points with the body at coordinates ($x_3$, $y_3$) and ($x_4$, $y_4$) relative to the reference point x.

The portions constituting the character are connected in this manner, and the connection data can be included in the character data as individual basic position table data. Therefore, even when a new character is produced by the generational transformation, the individual portions can be easily linked together simply by changing the coordinates of the head, the arms, the body and the legs as thy are related to the reference point x.

Figure 7A:
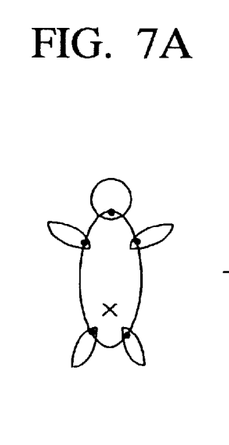
FIGS. 7A to 7C are diagrams for explaining a case where as actions of a character the portions of the character are rotated and displaced.
Figure 7B:
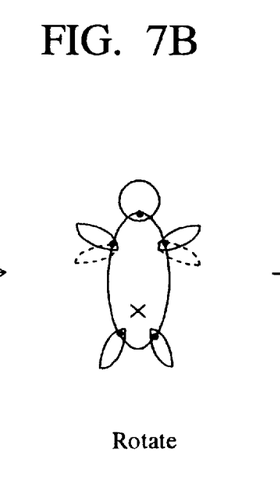
Figure 7C:
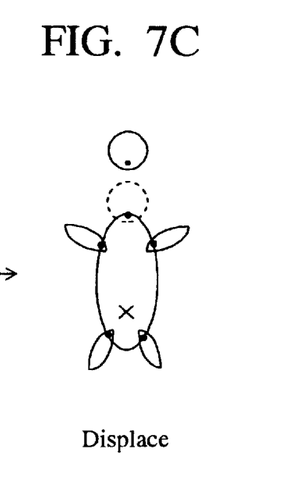

Further, when the constituent portions of the character are rotated or displaced as an action of the character, as is shown in FIG. 7, the pattern data for the portions of the character and the connection data (the relative coordinates) for the portions stored in the basic position table are changed, and the altered data are stored as action table data in the video RAM 410.

The calculations for changing the pattern data and the connection data (the relative coordinates) for the constituent portions of the character in accordance with actions by the character are performed by the first VDP 41 in FIG. 1.

Figure 8:
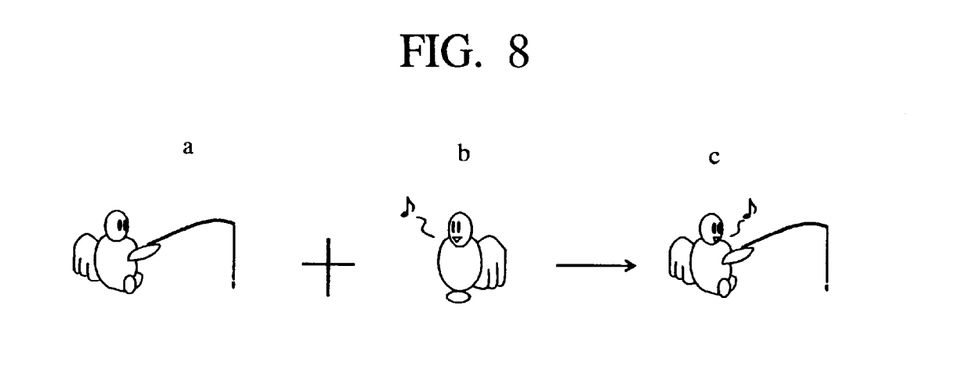
FIG. 8 is a diagram showing an example where a fishing pattern is defined as a special activity of one character.
Figure 9:
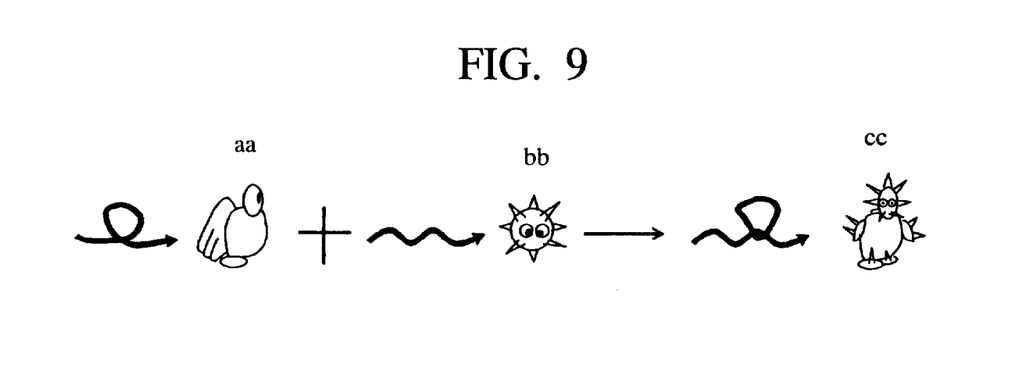
FIG. 9 is a diagram for explaining how traveling patterns for two characters are copied by the synthesis (the mating) of the two characters.

FIGS. 8 and 9 are diagrams for explaining another feature of the present invention. The feature of the present invention explained while referring to FIG. 2 is for a case where the form of a character is inherited by synthesis (the mating) of two characters. The examples in FIGS. 8 and 9 are those where the activity pattern for a character is copied by the synthesis (the mating) of two characters.

In the example in FIG. 8, activity pattern (a) for fishing is defined as a special activity of one character, and activity pattern (b) for whistling is defined as another special pattern of the character. In this example, when two characters are synthesized (mated), activity (c) for whistling while fishing is defined as a special activity for a newly created character.

Therefore, as is shown in FIG. 8, during the game the new character is displayed with activity pattern (c) for whistling while fishing.

In the example in FIG. 9, the traveling patterns of individual two characters are copied by the synthesis (the mating) of these characters. That is, when a character for which a traveling pattern (aa) for rotating during the movement is defined and a character for which a traveling pattern (bb) for surfing during the movement is defined are mated, a traveling pattern for rotating while surfing during the movement is defined as a traveling pattern (cc) for a character newly created by mating.

As described above, according to the present invention, a new character is displayed having a new special activity pattern or traveling pattern.

Figure 10A:
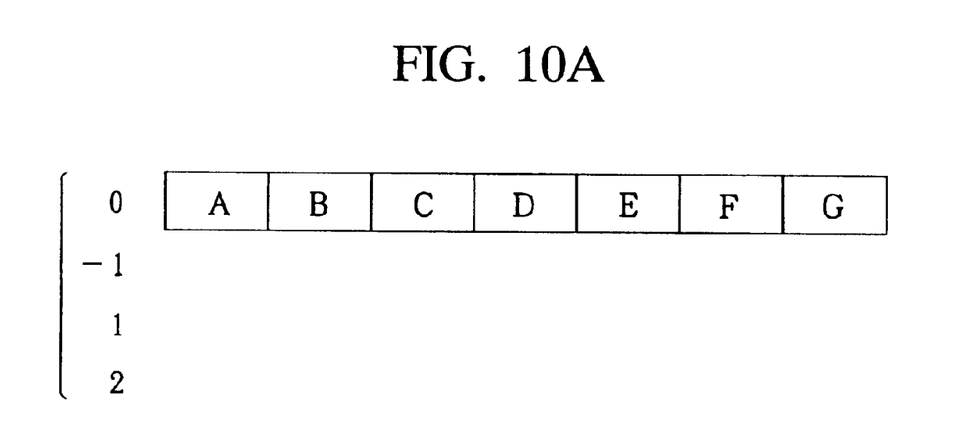
FIGS. 10A to 10C are diagrams for explaining the function by which background music is altered based on the progress of a game controlled by a user.
Figure 10B:
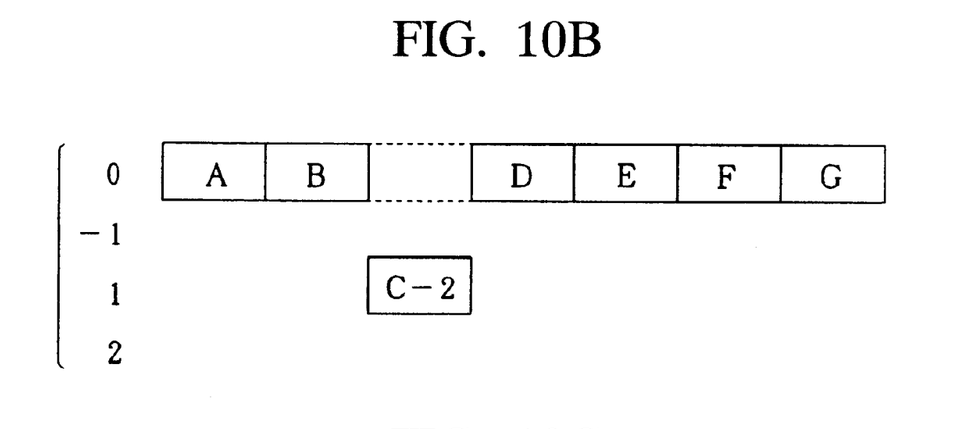
Figure 10C:
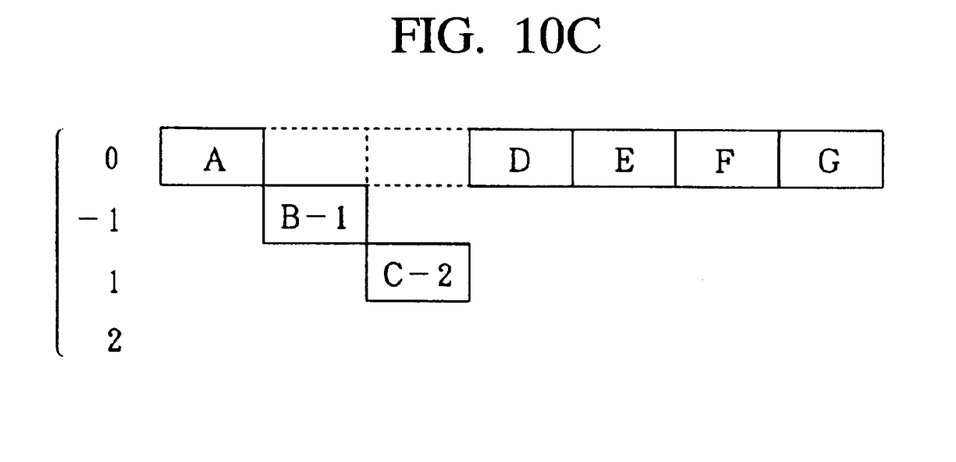
Figure 11:
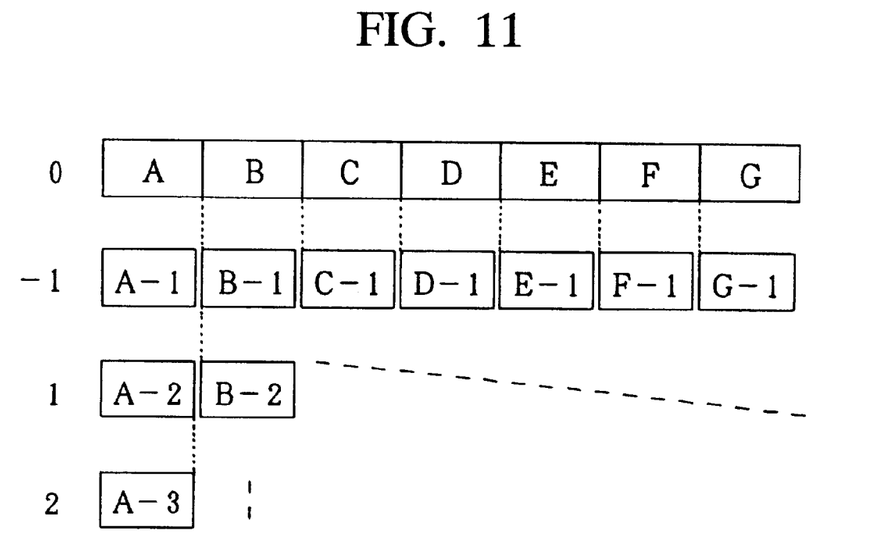
FIG. 11 is a diagram showing all the example music data.
Figure 12:
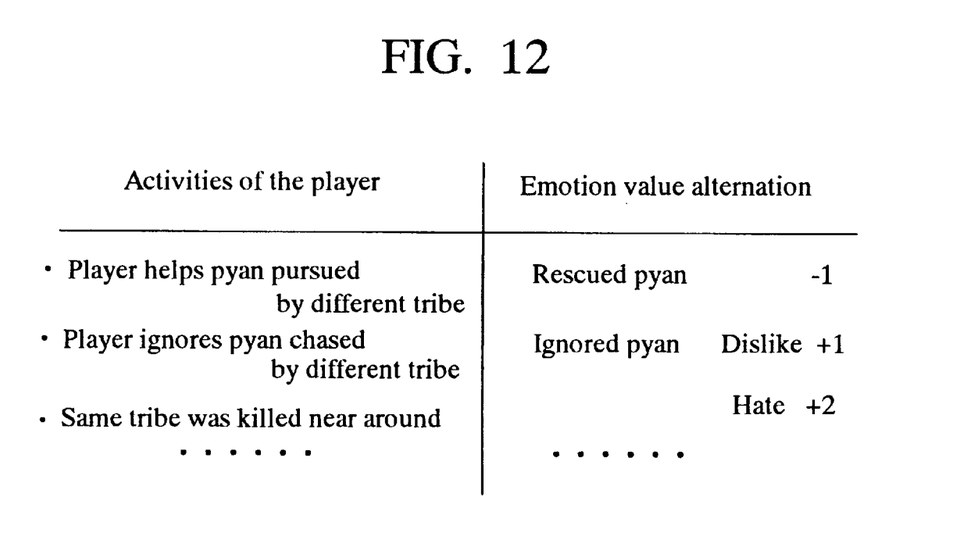
FIG. 12 is a diagram for explaining a change in the emotion value allotted to a background character as it is related to the activity of a player.

FIGS. 10 to 12 are diagrams for explaining, as the feature of the invention, a function for changing background music so that it is in accord with game situations consonant with user input.

Generally, characters which appear in the video game are sorted into two types: those for which their forms and the traveling patterns can be changed in response to the manipulation of the control pad 30 (see FIG. 1) by a user and those for which their forms and the traveling patterns are set in advance by the game program.

For the explanation of the present invention, a character of first type is called a player, and a character of second type is called a background character. As an example in the game program, the movement of the player in response to the manipulation of the control pad 30 by a user alters the emotion value allotted to the background character.

The emotion value allotted to the background character is a numerical data value that represents an emotional condition such as one where the background character dislikes the player or regards it as an enemy, or likes the player or regards it as an ally. In accordance with the emotion value and with whether the player is an ally or an enemy, the background character is moved closer to the display position of the player or farther from it in the opposite direction.

The relationship between the emotion value and the display pattern can be set in advance as a part of the character data in the game program.

Referring to FIGS. 10A to 10C again, as is shown in FIG. 10A background music including a plurality of measures A to G is prepared as reference musical tone data to be played in synchronization with activities shown on the display screen.

Furthermore, altered measures added to individual measures are prepared as the feature of the present invention. For example, measures A-1, A-2 and A-3 are obtained by altering measure A. The same preparation procedure is employed for the other measures B to G. Therefore, all the musical tone data are as shown in FIG. 11.

Assuming that in the present invention reference musical tone data A to G are the default, when the reference musical tone data A to G are replaced with measures which have been altered in accordance with changes in emotion values as they are related to the player, the background musical tones for the display screen can be changed.

Specifically, the musical data in FIG. 11 are stored in the RAM 71 in FIG. 1, and the definitions for measures corresponding to emotion values allotted to the background character as they are related to the player are stored by the CPU 70.

Assume that, for example, emotion values allotted to the background character as they are related to the player are default 0, like −1, dislike +1 and hate +2. Then, as is shown in FIG. 11, the emotion value 0 corresponds to the reference musical tone data A to G; the emotion value −1 corresponds to the changed measure musical tone data A-1 to G-1; the emotion value 1 corresponds to the changed measure musical tone data A-2 to G-2; and the emotion value 2 corresponds to the changed measure musical tone data A-3 to G-3.

Further, as is shown in FIG. 12 the emotion value allotted to the background character is changed as a consequence of the activities of the player. For example, when the player rescues a pyan which is being pursued by a different tribe, the emotion value allotted to the pyan which is rescued is changed by −2.

When the player ignores the pyan which is being chased by a different tribe, the emotion value allotted to the pyan which is ignored is changed by +1. As is described above, the emotion value allotted to the background character as it is related to the player is changed as a consequence of the activities of the player, i.e., in response to the manipulation of the control pad 30 by a user.

The CPU 70 employs the data read from the RAM 71 to calculate, for each stage of the game, the number of background characters whose emotion values as they are related to the player have been changed, and then calculates, for each emotion value, the ratio of the obtained number of background characters to the total number of characters.

Following this, a measure selected from the reference musical tone data A to G by using random numbers is replaced with altered-measure musical tone data selected from an altered-measure musical data group which corresponds to the emotion value obtained above.

When, for example, the obtained emotion value is 1, as is shown in FIG. 10B the measure musical data C, which is selected from the reference musical tone data A to G by using a random number, is replaced by altered-measure musical data C-2 selected from the musical data group A-2 to G-2 which corresponds to the emotion value 1.

The replaced musical data C-2 is stored in the RAM 71 to be used as the background music for the next stage. Then, the number of background characters is calculated whose emotion values as they are related to the player are changed in the next stage. A ratio of the obtained number of background characters to the total number of characters is calculated for each emotion value.

Supposing that the obtained emotion value is −1, as is shown in FIG. 10C, using a random number reference measure musical tone data B, for example, is selected from the reference measures (excluding measure C) A to G which have not yet been replaced, and is replaced with altered-measure musical data B-1 in the musical data group A-1 to G-1. Therefore, new background music is composed of measures A, B-1, C-2, D, E, F and G.

More specifically, assume that as the default for the first round of the game, the numbers of background characters corresponding to the emotion values −1, 0, +1 and +2 are 0, 10, 0 and 0, respectively.

And assume that for the second round of the game, the numbers of background characters corresponding to the emotion values −1, 0, +1 and +2 are 5, 5, 0 and 0, respectively. For the second round, the number of background characters having the emotion value of −1 is increased by five, a ratio of the characters having the emotion value of −1 to the total number of characters is 50%. In addition, since for the first round, the number of background characters having the emotion value of −1 was 0, the ratio of the characters having the emotion value of −1 is increased by 50%.

For the second round, the ratio of the background characters having the emotion value of 0 to the total number of background characters is 50% of the number of the total characters, and thus the number is reduced by 50% compared with the first round. The half of the measures which correspond to the emotion value 0 and have not yet been replaced are selected using random numbers, and are registered as measures which can be altered. Therefore, a measure corresponding to the emotion value of −1 is selected from among these registered measures.

Figure 13:
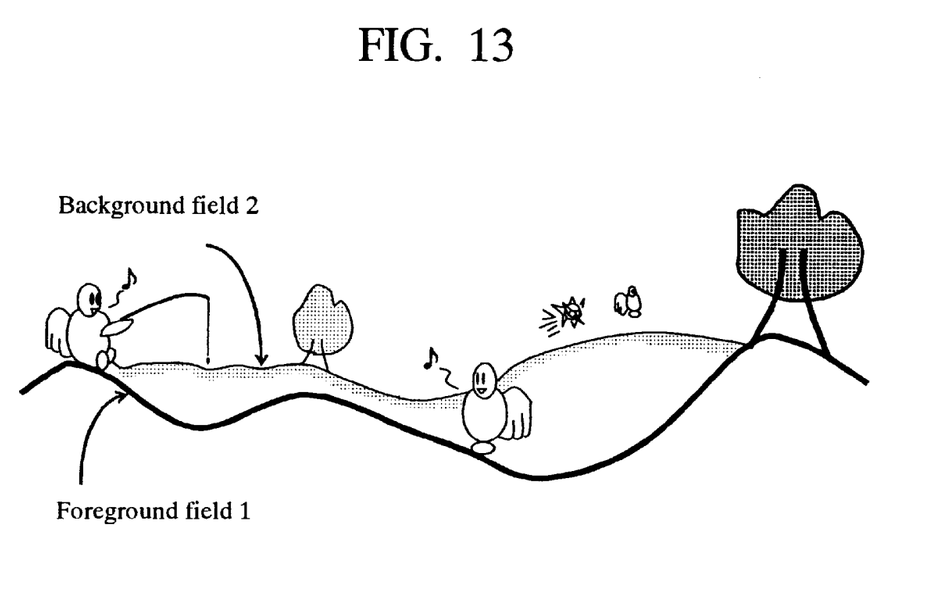
FIG. 13 is a diagram showing an example which represents the feature of a display method for a video game device according to the present invention.

FIG. 13 is a diagram showing the display method feature for the video game device of the present invention. That is, a foreground field 1 and a background field 2, both of which are scrolled, are employed to provide depth on the screen, so that a scene displayed on the screen looks greater.

Since the game is continued in the foreground field 1 and the background field 2, the background characters can independently repeat mating in a predetermined condition to produce a new living entity.

The player operated by the user is displayed in the foreground field 1, and the background characters can be so displayed that they can travel between the foreground field 1 and the background field 2.

An explanation has been given for a case where two background characters are synthesized (mated) when, as a predesignated condition, their display positions coincide. Then, there is the following state that exists when the display positions coincide in a predesignated condition.

First, an estrous cycle is set as character data for the background character. The program can be so set in advance that, when the estrous cycle comes during the execution of the game, the background character is moved to another background character so that their display positions coincide.

Also, it is possible for a background character to collide with a moving player and to be repelled so that by accident its display position coincides with the display position of another background character.

In the above embodiment, a user operates the control pad of a video game machine to control the movements of a player character shown on a display. The present invention, however, is not limited to this embodiment.

The present invention can also be applied for an environmental picture apparatus that displays pseudo-fish images in an aquarium to raise them. In other words, the theory for the present invention, generational transformation through the mating of background characters, is applied to pseudo-fish in an aquarium, and new forms of pseudo-fish can be produced.

INDUSTRIAL USABILITY

As is described above in the embodiment, according to the present invention, as the time during which a game is played is extended, the generational transformation process is repeated and new characters can be displayed as artificial living entities on a game screen.

Therefore, the interest of the user in the game can be extended. At the same time, a game program can be provided with which a user can savor an expanded virtual reality experience.

The above described embodiment is employed only for explaining the present invention, and the present invention is not limited to this embodiment. The protective scope of the present invention is defined by claims, and the equivalent of the claims is also included within the protective scope of the present invention.

What is claimed is:

1. A video game device comprising:
   a storage device for storing character data relating to a plurality of characters to be displayed on a display device and defining an inheritance probability for individual portions of each of the plurality of characters; and
   a controller for executing program data to generate a new character from a first and a second character, wherein the new character has individual portions in accordance with the specific inheritance probability of the individual portions that respectively constitute the first and second characters under a predetermined condition during execution of the program data.

2. The video game device according to claim 1, wherein the character data includes definitions of motion patterns for the plurality of characters to be displayed on the display device, and wherein
   the new character has a definition of specific motion patterns in accordance with inheritance probabilities of the motion patterns according to a predetermined condition during execution of the program data.

3. The video game device according to claim 2, wherein the character data includes definitions of traveling patterns for the plurality of characters to be displayed on the display device, and wherein
   the new character has a definition of specific traveling patterns in accordance with inheritance probabilities of the traveling patterns according to a predetermined condition during execution of the program data.

4. The video game device according to claim 2, wherein the predetermined condition during execution of the program data is that display coordinates of specific portions of the first and second characters displayed on the display device coincide.

5. The video game device according to claim 2, wherein the character data includes certain data related to a motion pattern of a character, wherein
   the memory stores basic music data including a plurality of measures and altered music data for each of said measures, and wherein
   the controller combines the altered music data for each of the measures at a predetermined probability according to a predetermined condition, and controls to play the combined altered music data as a background music for a game.

6. The video game device according to claim 1, wherein the character data includes definitions of traveling patterns for the plurality of characters to be displayed on the display device, and wherein
   the new character has a definition of specific traveling patterns in accordance with inheritance probabilities of the traveling patterns according to a predetermined condition during execution of the program data.

7. The video game device according to claim 1, wherein the predetermined condition during execution of the program data is that display coordinates of specific portions of the first and second characters displayed on the display device coincide.

8. A storage medium storing a game program to be executed in a video game device, said game program comprising:

character data that relates to a plurality of characters to be displayed on a display device and defines an inheritance probability for individual portions that constitute each of the plurality of characters, and wherein the game program is executed to generate a new character from a first and second character, wherein the new character has individual portions in accordance with the specific inheritance probability of the individual portions that respectively constitute the first and second characters under a predetermined condition during execution of the program data.

9. The storage medium according to claim 8, wherein the character data includes definitions of motion patterns for the plurality of characters to be displayed on the display device, and wherein the new character has a definition of specific motion patterns in accordance with inheritance probabilities of the motion patterns according to a predetermined condition during execution of the program data.

10. The video game device according to claim 9, wherein the predetermined condition during execution of the program data is that display coordinates of specific portions of the two characters displayed on the displayed device coincide.

11. The video game device according to claim 8, wherein the predetermined condition during execution of the program data is that display coordinates of specific portions of the first and second characters displayed on the display device coincide.

12. The video game device according to claim 8, wherein the character data includes definitions of traveling patterns for the plurality of characters to be displayed on the display device, and wherein the new character has a definition of specific traveling patterns in accordance with inheritance probabilities of the traveling patterns according to a predetermined condition during execution of the program data.

13. The video game device according to claim 8, wherein the character data includes certain data related to a motion pattern of a character, wherein a memory of said video game device is configured to store basic music data including a plurality of measures and altered music data for each of said measures, and wherein a controller of said video game device is configured to combine the altered music data for each of the measures at a predetermined probability according to a predetermined condition, and controls to play the combined altered music data as a background of a game.

14. An environmental video picture display apparatus comprising:

a memory device for storing character data relating to a plurality of characters to be displayed on a display device and defining an inheritance probability for individual portions of each of the plurality of characters; and a processor for executing program data to generate a new character from a first and a second character, wherein the new character has individual portions in accordance with the specific inheritance probability of the individual portions that respectively constitute the first and second characters under a predetermined condition during execution of the program data.

15. The environmental video picture display apparatus according to claim 14, wherein said plurality of characters to be displayed takes the form of fish in an aquarium.

* * * * *